US012261390B2

(12) United States Patent
Workman et al.

(10) Patent No.: US 12,261,390 B2
(45) Date of Patent: Mar. 25, 2025

(54) FLEXIBLE OUTLET COVER DEVICE

(71) Applicant: Jasco Products Company, Oklahoma City, OK (US)

(72) Inventors: Rob Workman, Oklahoma City, OK (US); Ryan Schick, Oklahoma City, OK (US); Joseph Kinyon, Oklahoma City, OK (US); Michelle Owens, Oklahoma, OK (US)

( * ) Notice: Subject to any disclaimer, the term of this patent is extended or adjusted under 35 U.S.C. 154(b) by 343 days.

(21) Appl. No.: 17/880,714

(22) Filed: Aug. 4, 2022

(65) Prior Publication Data

US 2024/0047914 A1 Feb. 8, 2024

(51) Int. Cl.
*H01R 13/443* (2006.01)
*H01R 13/447* (2006.01)

(52) U.S. Cl.
CPC ......... *H01R 13/443* (2013.01); *H01R 13/447* (2013.01)

(58) Field of Classification Search
None
See application file for complete search history.

(56) References Cited

U.S. PATENT DOCUMENTS

| | | | | |
|---|---|---|---|---|
| 2,728,894 A * | 12/1955 | Peters | H01R 13/447 174/67 |
| 2,932,811 A * | 4/1960 | Abraham | H01R 13/443 439/373 |
| 3,386,071 A * | 5/1968 | Marion | H01R 13/447 439/135 |
| 3,389,367 A * | 6/1968 | Schwartz | H01R 13/443 439/148 |
| 5,080,599 A * | 1/1992 | Wimberly | H01R 13/443 174/67 |
| 5,096,430 A * | 3/1992 | D'Amico | H01R 13/443 174/67 |
| 7,071,415 B1 | 7/2006 | Shotey et al. | |
| 7,396,997 B2 | 7/2008 | Dinh | |
| 7,674,977 B1 * | 3/2010 | Constantino | H02G 3/14 174/67 |
| 7,935,889 B1 | 5/2011 | Cleghorn | |
| 8,212,146 B1 | 7/2012 | Moore | |
| 10,587,067 B2 | 3/2020 | Lager | |
| 2008/0060831 A1 * | 3/2008 | Moore | H01R 13/443 174/67 |

* cited by examiner

*Primary Examiner* — Tho D Ta
(74) *Attorney, Agent, or Firm* — William D. Popejoy

(57) ABSTRACT

The present invention pertains to devices which cover one or more electrical outlets while at least one electrical outlet is in use. Embodiments described for the present invention comprise a cover having two or more substantially planar front panel surfaces and two or more substantially planar rear panel surfaces, two or more panels, two or more pairs of prongs extending from the two or more rear panel surfaces configured to fit into openings in at least one electrical outlet, one or more hinges located between the two or more panels, the one or more hinges configured to allow access to at least one electrical outlets while at least one electrical outlet is covered by at least one of the two or more panels, and the one or more hinges articulate the two or more panels away from the at least one electrical outlet.

17 Claims, 4 Drawing Sheets

FLEXIBLE OUTLET COVER DEVICE

BACKGROUND OF THE INVENTION

1. Field of the Invention

The present invention pertains to devices which cover electrical outlets. Particularly, electrical outlet covers which cover one or more electrical outlets while at least one electrical outlet is in use.

2. Description of the Related Art

While unattractive, unused electrical outlets can be unsafe. Young children that are curious and do not understand the potential danger of direct access to electricity are especially vulnerable. Dirt, moisture, and other foreign matter may also enter the openings of an unused electrical outlet if the outlet is left exposed. Outlet covers provide valuable protection against the direct access to electricity and protect against the dangerous contamination of unused electrical outlets.

One common type of outlet cover is a single panel dual outlet cover that covers both electrical outlets of a dual outlet configuration. When access of one of the two outlets is needed, the entire cover must be removed. U.S. Pat. No. 10,587,067 provides an example of a single panel cover. Outlet covers may be comprised of one or more pairs of prongs extending from the rear of the cover, and the covers may also be comprised of one or more single ground alignment posts.

While a single panel dual outlet cover provides protection against unwanted access to electricity and contamination while the cover is attached, it is unable to protect an unused outlet when the other outlet of a dual outlet configuration is in use.

U.S. Pat. No. 10,587,067 discloses an outlet safety cover plate includes having a front face and a rear side; a first pair of prongs extending from the rear side of the cover, the first pair of prongs configured to fit into a first pair of contact openings in an electrical outlet, and a second pair of prongs extending from the rear side of the cover, the second pair of prongs aligned with the first pair of prongs and configured to fit into a second pair of contact openings in an electrical outlet, where a width of the first pair of prongs is approximately two thirds of a width of the second pair of prongs. In another example, the outlet safety cover plate includes first and second covers that align with each other when inserted in an electrical outlet.

U.S. Pat. No. 8,212,146 discloses a cover panel that plugs into unused electrical outlets and camouflages or conceals the receptacle and faceplate and creates a safety barrier to the electrical components of an unused electrical outlet. Embodiments of the cover panel include a solid panel front surface of non-conductive molded material with a paintable surface on the outside and posts adapted to fit into the orifices of an electrical socket on the inside. The cover panel fits over the outlet's faceplate and is plugged into the socket, requiring no tools to install or remove. Embodiments of the cover panel have a paintable surface which can be painted to match or complement nearby walls camouflaging unused outlets. The painted cover panel serves as a physical barrier to the electrical outlet, and makes the electrical outlet less conspicuous.

Embodiments include cover panels containing recycled acrylonitrile butadiene styrene U.S. Pat. No. 7,935,889 discloses an electrical device cover with a lid coupled to a base unit by a pin and clip hinge. Implementations of a pin and clip hinge may comprise a clip with a rotation stop that tightens against the pin when the lid is opened too far on the base in a way that would ordinarily overextend the hinge.

U.S. Pat. No. 7,071,415 discloses a plurality of approaches for forming a horizontal and vertical electrical device cover including providing hinge members on opposing sides of the cover that allow the cover to pivot along adjacent-sided axes for horizontal and vertical mounting, providing a removable pin and corresponding cover and base hinge members wherein the removable pin may be placed along either the horizontal or vertical axis for selective horizontal or vertical mounting; providing a pivoting hinge arm that is pivotable between adjacent sides of the unit for selective horizontal or vertical mounting; and providing selectively attachable hinge members that may be attached by the installer at the time of installation to choose between horizontal or vertical mounting configurations.

U.S. Pat. No. 7,396,997 discloses a weatherproof electrical outlet box assembly for shielding and protecting electrical components from moisture including a faceplate for attaching to an outlet box, the faceplate being substantially planar, and perimetrically bounded by a substantially rectangular side edge, the faceplate having at least one aperture for receiving an electrical component; and the faceplate including a first hinge socket and a second hinge socket extending respectively from the side edge in substantially orthogonal orientation. The weatherproof electrical outlet box assembly further including a cover having a front wall, an opposed open end and a substantially rectangular perimetrical side wall there between defining a cover interior, the side wall having a rim bounding the open end, the cover including at least one access port through the side wall adjacent the open end for providing separate passageways into the interior of the cover; the cover including a first hinge pin and a second hinge pin extending respectively from the side wall adjacent the open end in substantially orthogonal orientation; and the cover being pivotally affixed to the faceplate by operative engagement of the hinge socket with the hinge pin of corresponding orientation and movable between an open and a closed position and wherein the hinge pin and the hinge socket that are not in operative engagement are not aligned.

SUMMARY OF THE INVENTION

The present invention comprises an electrical outlet cover device. The invention provides protection from unwanted electrical access or electrical compromise while one or more electrical outlets are in use.

Embodiments described for the present invention comprise a cover having two or more substantially planar front panel surfaces and two or more substantially planar rear panel surfaces, where the two or more rear panel surfaces are formed by beveled edges which surround the two or more solid panel front surfaces and form two or more recessed areas, two or more panels, where the two or more front panel surfaces are configured to be parallel to the two or more rear panel surfaces, where two or more pairs of prongs extending from the two or more rear panel surfaces are configured to fit into openings in at least one electrical outlet, one or more hinges located between the two or more panels, the one or more hinges configured to allow access to at least one electrical outlet while at least one electrical outlet is covered by at least one of the two or more panels, the one or more hinges articulate the two or more panels away from the at least one electrical outlet.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

While the invention has been described in connection with certain preferred embodiments, other embodiments would be understood by one of ordinary skill in the art and are encompassed herein. Elements with corresponding reference numerals.

Figure 1:
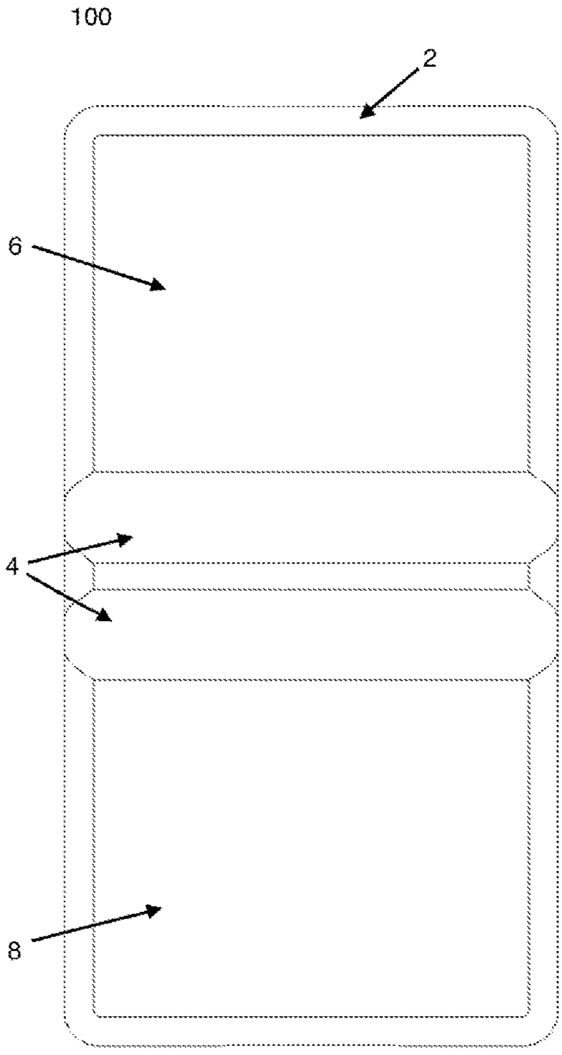
FIG. 1 shows a front elevational view of an embodiment of a device.

Flexible Outlet Cover Device 100
Beveled edge 2
Front side of hinge 4
Upper front panel 6
Lower front panel 8
Upper rear panel 10
Lower rear panel 12
Prongs 14
Hinge 16
Middle extension piece 18
Finger relief notch 20

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in order to facilitate describing the subject innovation. Moreover, it is to be appreciated that the drawings may not be to scale.

FIG. 1 shows a front elevational view of an embodiment of the device. A cover having two or more substantially planar front panel surfaces, where the two or more front panel surfaces are surrounded by beveled edges. In this embodiment, the front panel surfaces are comprised of an upper front panel 6 and a lower front panel 8. Alternate embodiments may have more than two panels and front panel surfaces. The front side of hinge 4 allows for flexion of the flexible outlet cover device 100. The flexion permits the front panel surfaces to articulate away from an outlet, which allows an electrical cord to be plugged into an outlet while one or more of the panel surfaces maintain coverage of one or more electrical outlets. Two or more panels are comprised of the two or more front panel surfaces and rear panel surfaces.

Figure 2:
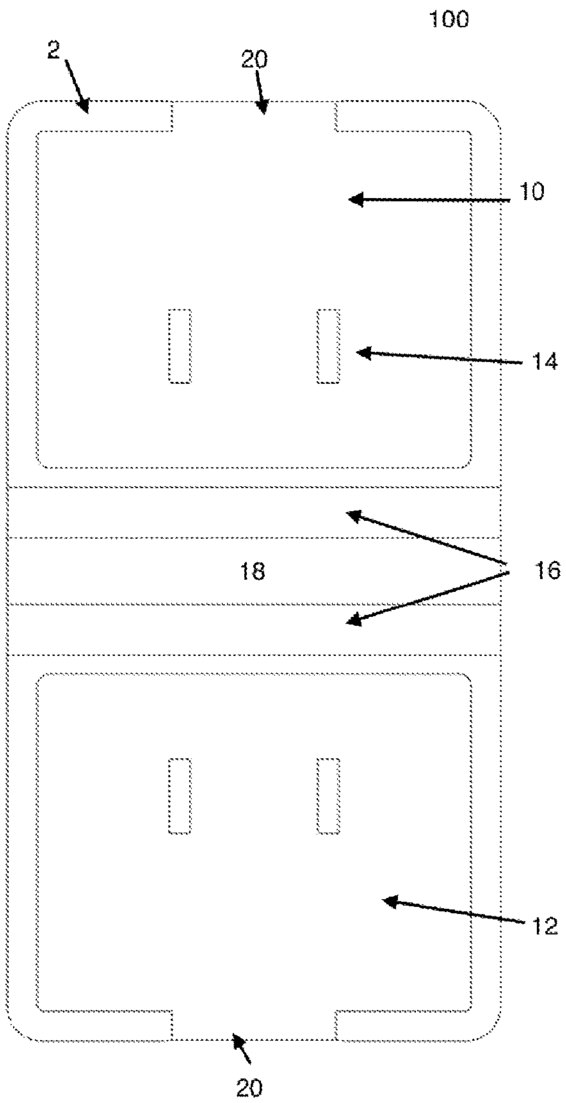
FIG. 2 shows a rear elevational view of an embodiment of the device.
Figure 3:
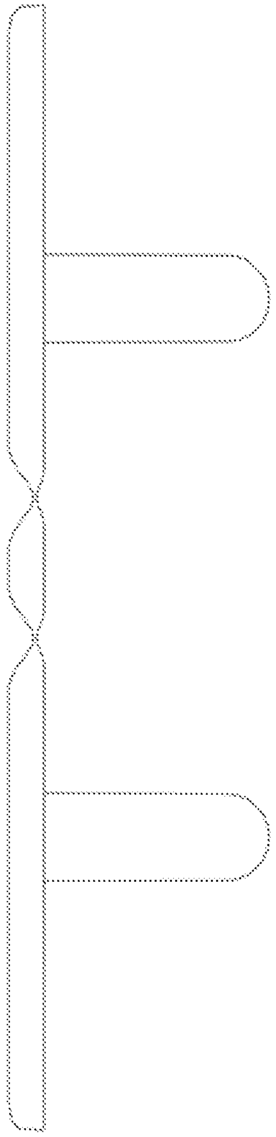
FIG. 3 shows a right side elevational view of an embodiment of the device.

FIG. 2 shows a rear elevational view of an embodiment of the device. A cover having two or more rear panel surfaces formed by more than one beveled edge 2 which create two or more recessed areas. In this embodiment, the rear panel surfaces are comprised of an upper rear panel 10 and a lower rear panel 12. Alternate embodiments may have more than two rear panel surfaces. Two or more pairs of prongs 14 extend from the two or more rear panel surfaces, and are configured to fit into openings in at least one electrical outlet. One or more hinges 16 articulate the rear panel surfaces away from at least one outlet. The one or more hinges 16 are configured to allow access to at least one electrical outlet while at least one electrical outlet is covered by at least one of two or more panels. A finger relief notch 20 provides easier finger initiated removal of at least one of the two or more panels from an electrical outlet.

In this embodiment, a middle extension piece 18 separates two hinges 16. The middle extension piece 18 and the two hinges provide a user multiple flexion points of the device to provide wider electrical outlet access.

In some embodiments, the one or more hinges 16, the two or more panels, and the two or more prongs 14 are constructed of substantially the same material. The one or more hinges 16 located between the panels may run horizontal and/or vertical in relation to the cover. The two or more rear panel surfaces may accommodate the two or more pairs of prongs 14 in one of the two or more rear panel surfaces.

Figure 4:
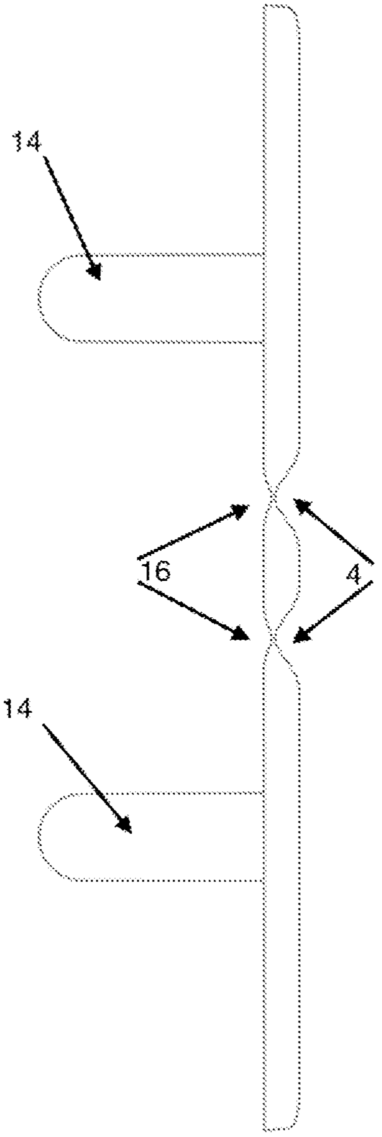
FIG. 4 shows a left side elevational view of an embodiment of the device.
Figure 5:
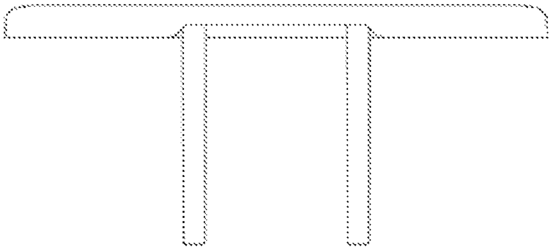
FIG. 5 shows a bottom plan view of an embodiment of the device.
Figure 6:
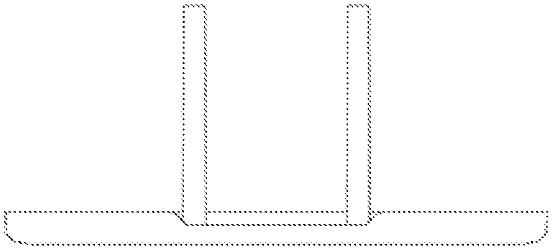
FIG. 6 shows a top plan view of an embodiment of the device.

FIG. 4 shows a left elevational view of an embodiment of a device. The two or more pairs prongs 14 extend from the device. The prongs 14 are configured to secure the cover to an electrical outlet. A side view of the front side of the hinges 4 and the hinges 16 illustrate the flexion points of the device. In this embodiment, a user may select between two flexion points to allow access of the outlet for an electrical plug.

Figure 7:
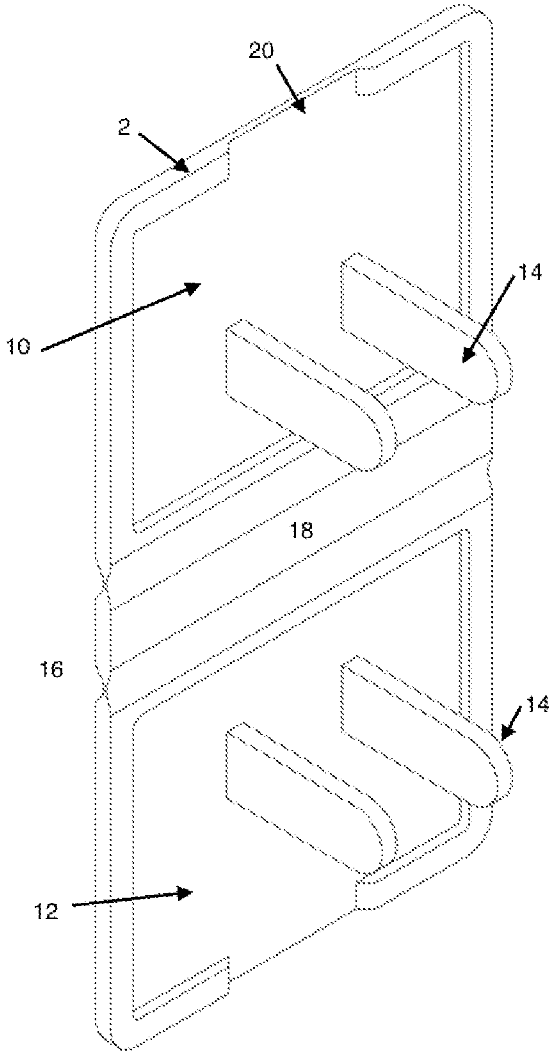
FIG. 7 shows a perspective view of an embodiment of the device.
Figure 8:
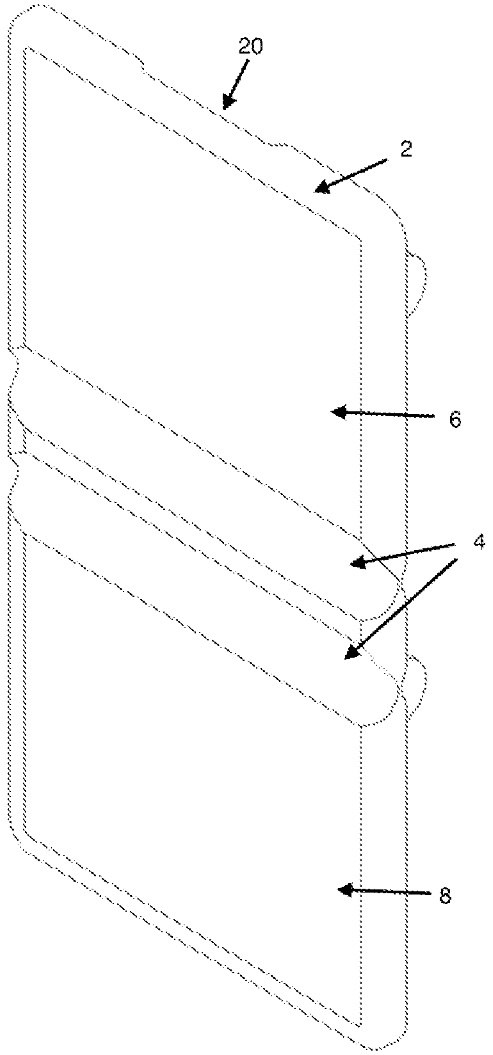
FIG. 8 shows a perspective view of an embodiment of the device.

FIG. 7 and FIG. 8 show perspective views of an embodiment of a device. A cover having two or or more substantially planar front panel surfaces and two or more substantially planar rear panel surfaces, where the two or more rear panel surfaces are formed by beveled edges which surround the two or more solid panel front surfaces and form two or more recessed areas. The two or more front panel surfaces are configured to be parallel to the two or more rear panel surfaces.

In some embodiments, one or more hinges and two or more panels are coplanar.

Although the present invention has been described in relation to particular embodiments thereof, many other variations and modifications will become apparent to those skilled in the art. It is preferred, therefore, that the present invention be limited not by the specific disclosure herein, but only by the appended claims. Alternate embodiments may be devised without departing from the spirit or scope of the invention. Further, the particular feature or structure may be combined in any suitable manner in one or more embodiments.

What is claimed is:

1. An outlet cover device, comprising:
a cover having two or more substantially planar front panel surfaces and two or more substantially planar rear panel surfaces, where each of the two or more rear panel surfaces are formed by beveled edges which surround each of the two or more front panel surfaces and form two or more recessed areas;
two or more panels;
the two or more front panel surfaces configured to be parallel to the two or more rear panel surfaces;
two or more pairs of prongs extending from the two or more rear panel surfaces configured to fit into openings in at least one electrical outlet;
one or more hinges located between the two or more panels;
one or more front sides of the one or more hinges;
the one or more hinges configured to allow access to at least one electrical outlet while at least one electrical outlet is covered by at least one of the two or more panels;
the one or more hinges articulate the two or more panels away from the at least one electrical outlet;
whereas each of the two or more rear panel surfaces are comprised of exactly four sides and each of the exactly four sides are formed by beveled edges;
whereas the cover is configured to abut against a wall plate surrounding the at least one electrical outlet covered by at least one of the two or more panels when the one or more hinges articulate to permit access to at least one electrical outlet; and
whereas the one or more front sides of the one or more hinges are configured to accommodate flexion of the cover whereas the flexion accommodates articulation of each of the two or more substantially planar front panel surfaces away from at least one electrical outlet where each of the two or more rear panel surfaces are formed by beveled edges.

2. The outlet cover device of claim 1, further comprising:
the one or more hinges, the two or more panels, and the two or more prongs are constructed of substantially the same material.

3. The outlet cover device of claim 1, further comprising:
the one or more hinges located between the panels runs horizontal in relation to the cover.

4. The outlet cover device of claim 1, further comprising:
the one or more hinges located between the panels runs vertical in relation to the cover.

5. The outlet cover device of claim 1, further comprising:
the two or more rear panel surfaces accommodate two or more pairs of prongs in one of the two or more rear panel surfaces.

6. The outlet cover device of claim 1, further comprising:
two or more hinges;
at least one middle extension piece located between the two or more hinges which accommodates access to the at least one electrical outlet;
the two or more hinges configured to accommodate the articulation of each of the two or more rear panel surfaces formed by beveled edges; and
the at least one middle extension piece is made of substantially the same material.

7. The outlet cover device of claim 1, further comprising:
the one or more hinges are coplanar with the two or more panels.

8. The outlet cover device of claim 1, further comprising:
a finger relief notch; and
the finger relief notch configured to provide easier finger initiated removal of at least one of the two or more panels from the at least one electrical outlet.

9. An outlet cover device, comprising:
a cover having two or more substantially planar front panel surfaces and two or more substantially planar rear panel surfaces, where each of the two or more rear panel surfaces are formed by beveled edges which surround each of the two or more front panel surfaces and form two or more recessed areas;
two or more panels;
the two or more front panel surfaces configured to be parallel to the two or more rear panel surfaces;
two or more pairs of prongs extending from the two or more rear panel surfaces configured to fit into openings in at least one electrical outlet;
one or more hinges located between the two or more panels;
at least one middle extension piece;
whereas the at least one middle extension piece extends the width of the cover;
the one or more hinges configured to allow access to at least one electrical outlet while at least one electrical outlet is covered by at least one of the two or more panels;
the one or more hinges articulate the two or more panels away from the at least one electrical outlet;
whereas the cover is configured to abut against a wall plate surrounding the at least one electrical outlet covered by at least one of the two or more panels when the one or more hinges articulate to permit access to at least one electrical outlet; and
whereas one or more front sides of the one or more hinges are configured to accommodate flexion of the cover whereas the flexion accommodates articulation of each of the two or more substantially planar front panel surfaces away from at least one electrical outlet where each of the two or more rear panel surfaces are formed by beveled edges.

10. The outlet cover device of claim 9, further comprising:
the one or more hinges, the two or more panels, and the two or more prongs are made of substantially the same material.

11. The outlet cover device of claim 9, further comprising:
the one or more hinges located between the panels runs horizontal in relation to the cover.

12. The outlet cover device of claim 9, further comprising:
the one or more hinges located between the panels runs vertical in relation to the cover.

13. The outlet cover device of claim 9, further comprising:
the two or more rear panel surfaces accommodate two or more pairs of prongs in one of the two or more rear panel surfaces.

14. The outlet cover device of claim 9, further comprising:
the one or more hinges are coplanar with the two or more panels.

15. The outlet cover device of claim 9, further comprising:
a finger relief notch; and
the finger relief notch configured to provide easier finger initiated removal of at least one of the two or more panels from the at least one electrical outlet.

16. An outlet cover device, comprising:

a cover having two or more substantially planar front panel surfaces and two or more substantially planar rear panel surfaces, where each of the two or more rear panel surfaces are formed by beveled edges which surround each of the two or more front panel surfaces and form two or more recessed areas;

two or more panels;

the two or more front panel surfaces configured to be parallel to the two or more rear panel surfaces;

two or more pairs of prongs extending from the two or more rear panel surfaces configured to fit into openings in at least one electrical outlet;

two or more hinges located between the two or more panels;

at least one middle extension piece;

whereas the at least one middle extension piece extends the width of the cover;

the two or more hinges configured to allow access to at least one electrical outlet while at least one electrical outlet is covered by at least one of the two or more panels;

the two or more hinges articulate the two or more panels away from the at least one electrical outlet;

whereas each of the two or more rear panel surfaces are comprised of exactly four sides and each of the exactly four sides are formed by beveled edges;

whereas the cover is configured to abut against a wall plate surrounding the at least one electrical outlet covered by at least one of the two or more panels when one of the two or more hinges articulate to permit access to at least one electrical outlet; and whereas the at least one middle extension piece and the two or more hinges are configured to provide a user more than one option in an area of the cover that remains abutted against the wall plate surrounding the at least one electrical outlet covered by at least one of the two or more panels when one of the two or more hinges articulate to permit access to at least one electrical outlet.

17. The outlet cover device of claim 16, further comprising:

two or more front sides of the two or more hinges; and whereas the two or more front sides of the two or more hinges are configured to accommodate flexion of the cover whereas the flexion accommodates articulation of the two or more substantially planar front panel surfaces away from at least one electrical outlet where the two or more rear panel surfaces are formed by beveled edges.

* * * * *